April 26, 1938.  J. A. SARGENT  2,115,472
AUTOMOBILE AIR CONDITIONING MEANS
Filed Aug. 8, 1933  5 Sheets-Sheet 1
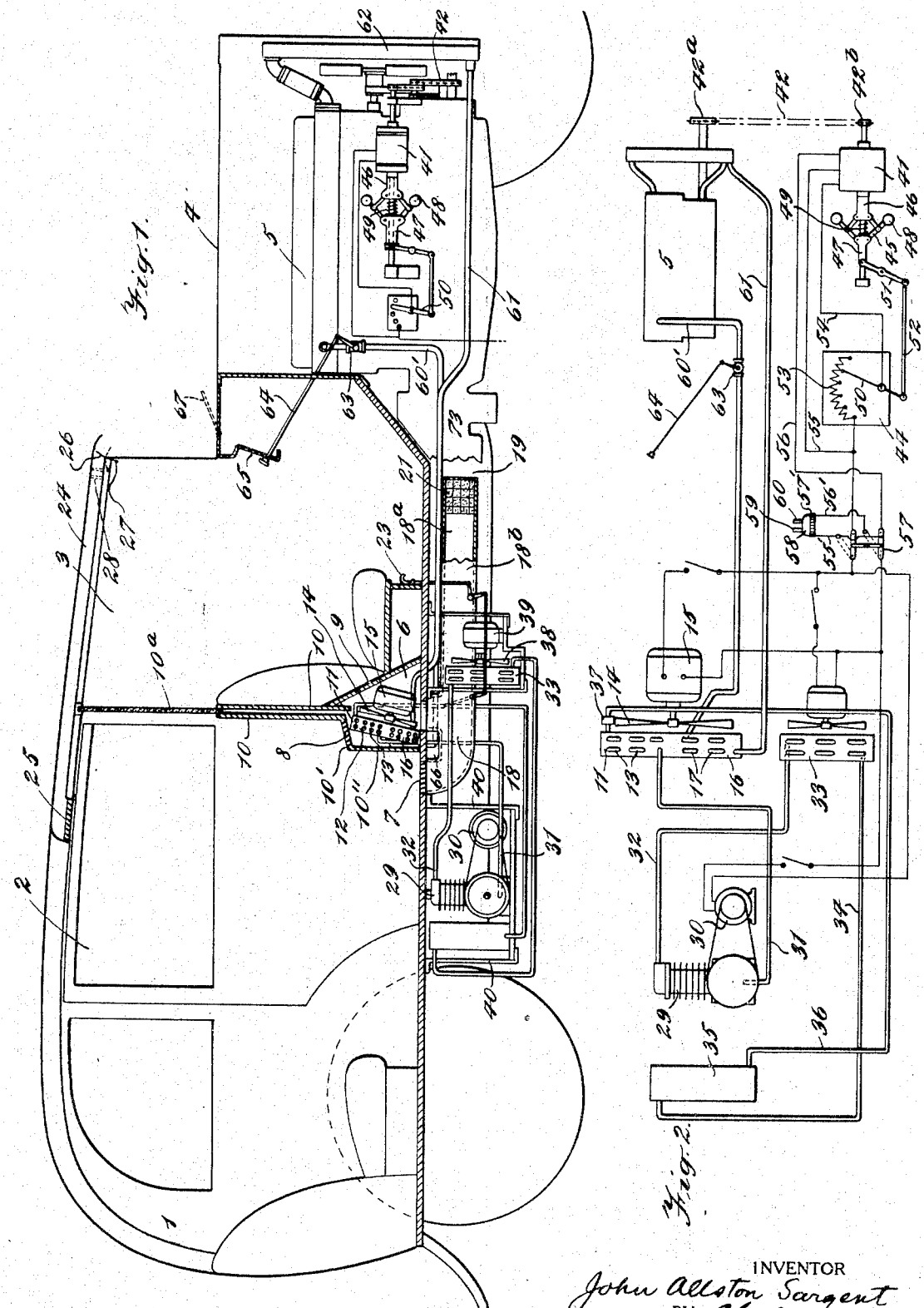
INVENTOR
John Allston Sargent
BY
ATTORNEY

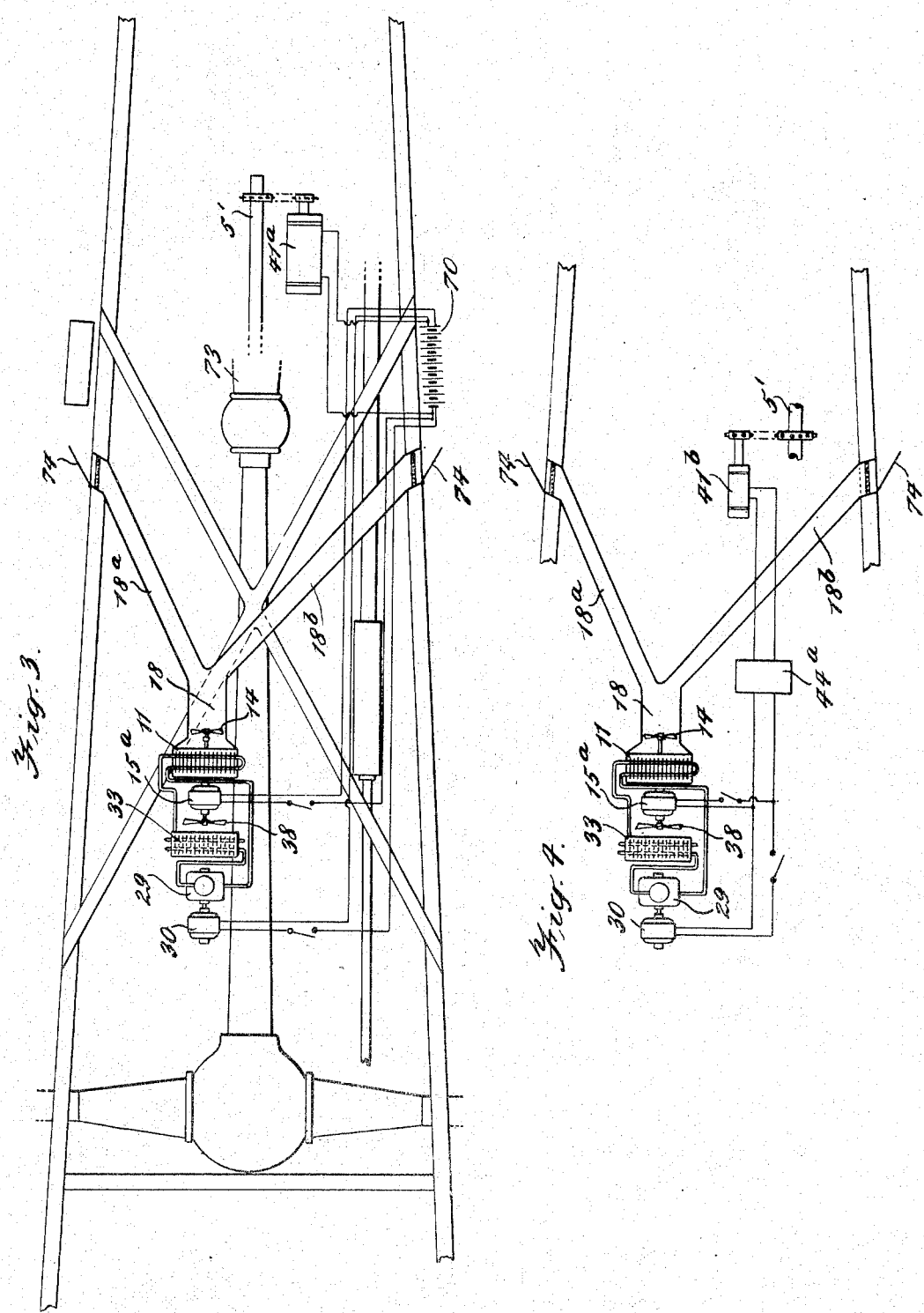

April 26, 1938.　　　　J. A. SARGENT　　　　2,115,472
AUTOMOBILE AIR CONDITIONING MEANS
Filed Aug. 8, 1933　　　5 Sheets-Sheet 3
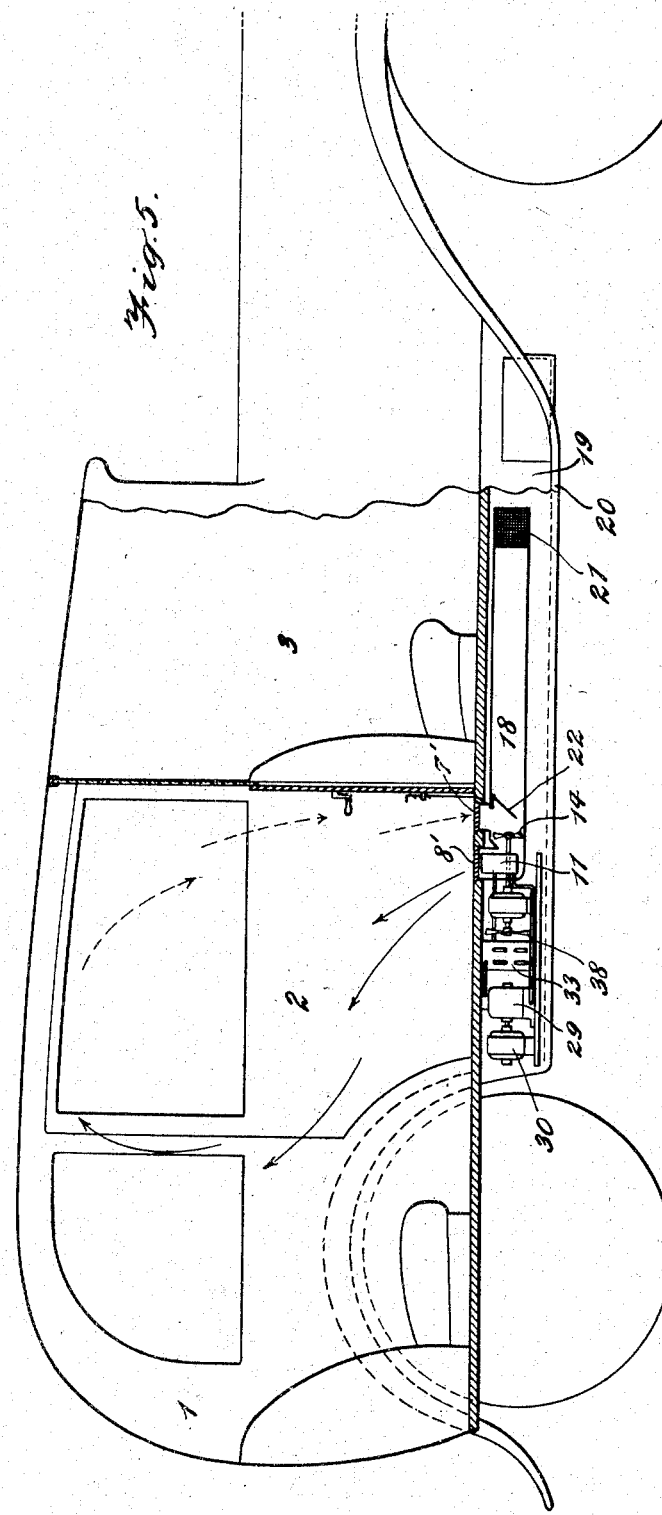
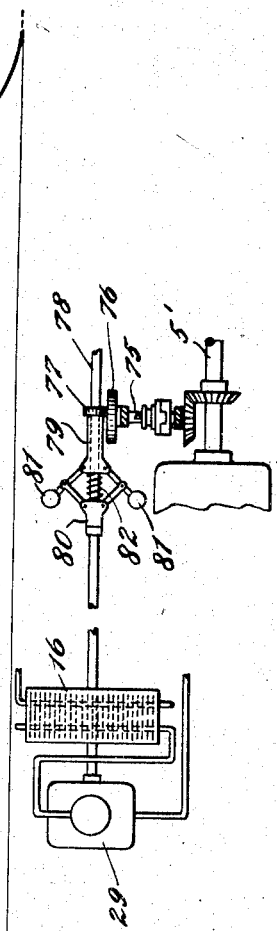
INVENTOR
John Allston Sargent
BY
his ATTORNEY

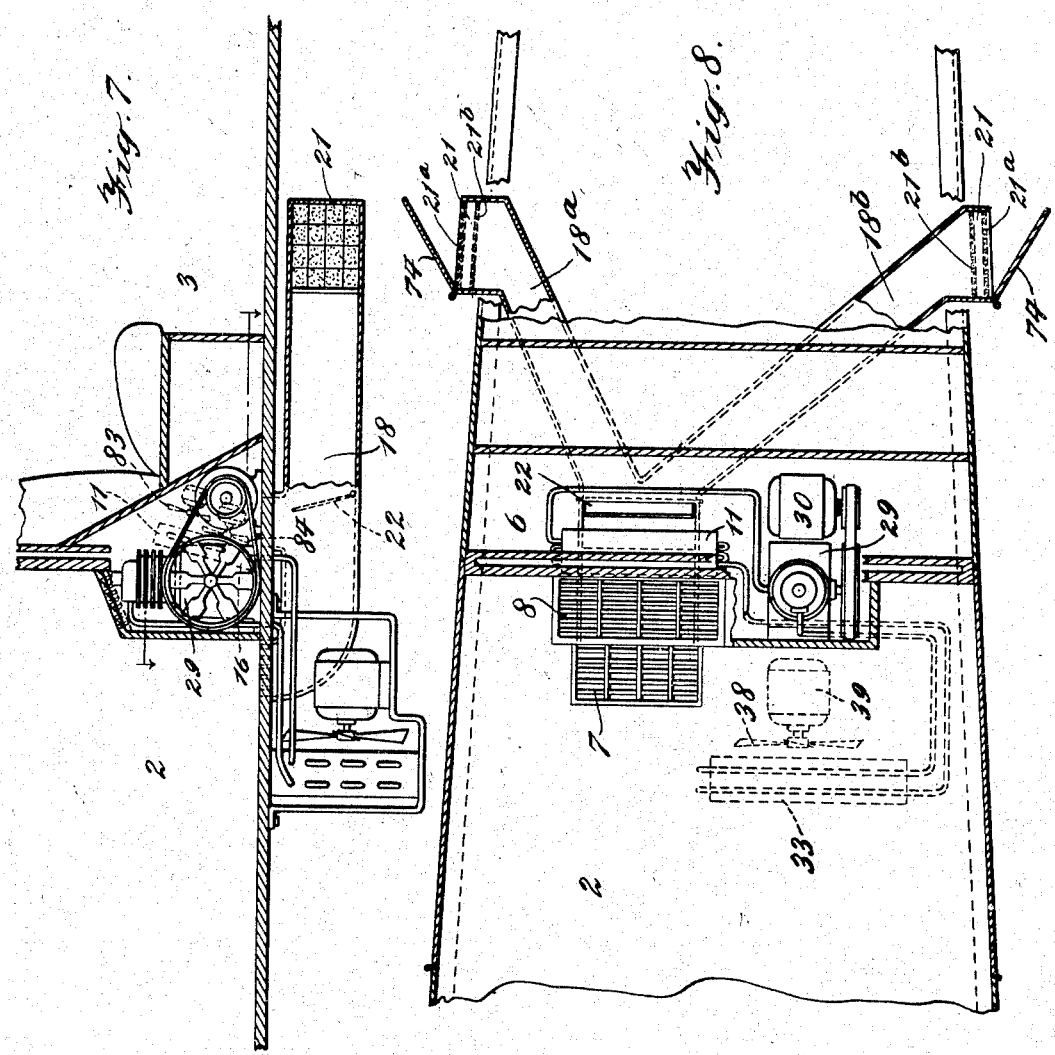

April 26, 1938. J. A. SARGENT 2,115,472
AUTOMOBILE AIR CONDITIONING MEANS
Filed Aug. 8, 1933 5 Sheets-Sheet 5
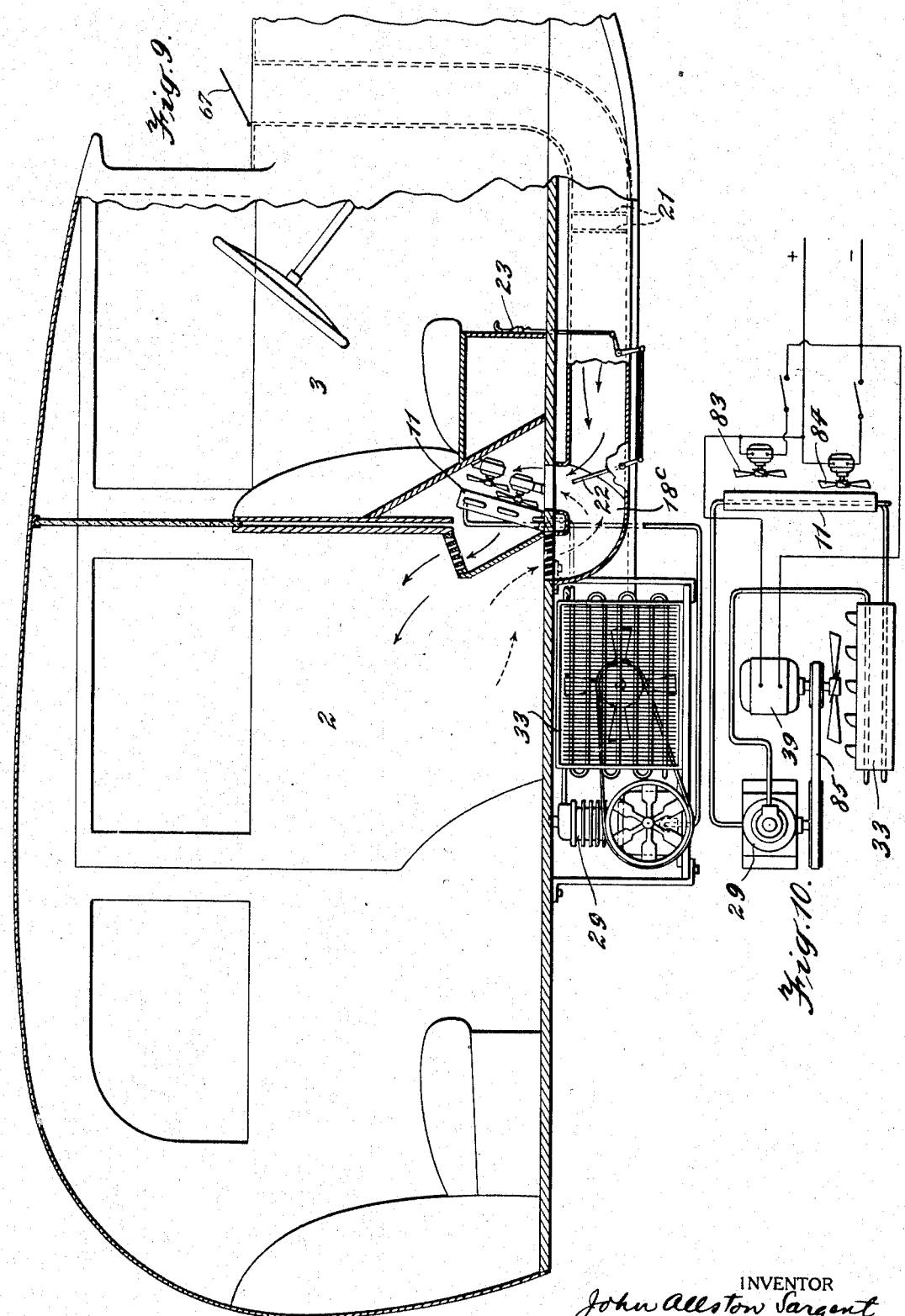
INVENTOR
John Allston Sargent
BY
his ATTORNEY Patented Apr. 26, 1938

2,115,472

UNITED STATES PATENT OFFICE 2,115,472

AUTOMOBILE AIR CONDITIONING MEANS

John Allston Sargent, Bronxville, N. Y., assignor to Campbell Metal Window Corporation, New York, N. Y., a corporation of Maryland Application August 8, 1933, Serial No. 684,172

2 Claims. (Cl. 98—2)

The general object of the present invention is to provide an automobile, and particularly an ordinary automobile of the closed body type, with simple and effective means for maintaining desirable atmospheric conditions in some or all of the enclosed space provided in the automobile for the use of its occupants. Heretofore, as is well known to those skilled in the art, various arrangements have been proposed, and some of them have been put into use, for heating the interiors or passenger receiving spaces of automobiles of the closed body type, and for ventilating such spaces, and my invention comprises improvements in means employed for such heating and ventilating purposes. A primary purpose of the present invention, however, is not merely to provide improved means for accomplishing heating and ventilating purposes heretofore accomplished more or less effectively by other means, but is to provide practically effective means for actually cooling the atmosphere within the passenger receiving space of an automobile of the closed body type, and of cleaning and purifying the air supplied to such space from the external atmosphere as required to maintain atmospheric conditions therein conducive to the health and comfort of the occupants.

In accordance with the present invention, I provide the automobile with air conditioning means including a mechanical refrigerating system for artificially producing a temperature within the occupant space of the automobile below the temperature of the external atmosphere when such cooling is desirable. In accordance with the present invention, also, I provide the automobile with means for effectively cleaning and purifying the make-up air supplied to the occupant space of the automobile from the external atmosphere to make up for the leakage of air out of that space and to avoid objectionable contamination thereof by the exhalations of the occupants. In preferred forms of embodiment of the invention, the air cleaning and purifying means provided includes air filter means, effective not only to eliminate ordinary dust from the entering air, but also to adsorb from the latter noxious gases or fumes, such for example as those with which the outside atmosphere immediately behind an automobile or truck is frequently polluted to a seriously objectionable extent by the exhaust from the last mentioned automobile or truck. The gas or fume absorbing means may form a part of the dust eliminating filter means or may be incorporated in separate filter means, and may comprise adsorbent material such as silica-gel, or activated carbon, having suitable fume adsorbing capacity.

I am aware, of course, of the previous use of air conditioning provisions including mechanical refrigerating apparatus, to improve atmospheric conditions in theatres, office buildings, dwelling houses and apartments. I am aware, also of the general use of apparatus for refrigeration purposes in railway cars and ships as well as in stationary warehouse and storage spaces for meats, fruits and vegetables. I believe I am the first, however, to recognize the practical desirability and feasibility of artificially cooling and suitably purifying the atmosphere within the occupant space of an ordinary automobile of the closed body type, and believe that I am the first to provide an automobile with practically effective and suitable means for the purpose.

My invention is characterized specifically by various features of construction and arrangement whereby the air conditioning means employed are adapted to the spatial and operative requirements attending their use in an ordinary automobile of the closed body type.

The various features of novelty which characterize the present invention are pointed out with particularity in the claims annexed to and forming a part of the present specification. For a better understanding of the invention, however, its advantages and specific objects obtained with it, reference should be had to the accompanying drawings and descriptive matter in which I have illustrated and described preferred embodiments of the invention, and some of the different forms of construction and arrangement which may advantageously be employed in practice under varying conditions of use.

Of the drawings:

Fig. 1 is a somewhat conventional elevation with parts broken away and in section, of an automobile embodying a preferred form of the present invention.

Fig. 2 is a diagrammatic representation of air conditioning apparatus and driving means therefor employed in Fig. 1.

Fig. 3 is a somewhat diagrammatic plan of parts of the underbody portion of an automobile provided with air conditioning means differing in some respects from those illustrated in Figs. 1 and 2.

Fig. 4 is a partial plan taken similarly to Fig. 3 and illustrating an arrangement differing from that of Fig. 3 in respect to the means employed for energizing air conditioning motors.

Fig. 5 is a view generally similar to Fig. 1 illustrating a modified air conditioning arrangement.

Fig. 6 is a diagrammatic representation of an arrangement in which the refrigerating compressor is driven from the automobile engine through a variable speed transmission.

Fig. 7 is a partial section taken similarly to Fig. 1, and illustrating a modified disposition of refrigerating apparatus.

Fig. 8 is a plan in section on the line 8—8 of Fig. 7.

Fig. 9 is a view taken similarly to Fig. 1 illustrating still another arrangement of refrigerating apparatus; and Fig. 10 is a diagrammatic view of apparatus shown in Fig. 9.

In the embodiment of the invention illustrated somewhat conventionally and diagrammatically, in Figs. 1 and 2, the body 1 of an automobile of the well-known sedan type having a normally closed main passenger compartment 2 and a wholly or partially enclosed driver's compartment 3 interposed longitudinally of the automobile, between the compartment 2 and the usual hood 4 enclosing the automobile engine 5 and immediately associated power plant parts of the automobile, and in accordance with the present invention, the body 1 is also shaped to provide a compartment 6 for use in the recirculation and temperature modification of air drawn from and returned to the compartment 2, through an outlet 7 and inlet 8, respectively. As shown in Fig. 1 the compartment 6 is located immediately above the floor of the automobile body and immediately back of the supporting framework 9 for the seats in the compartment 3, the compartment 6 extending both in front and to the rear of the upper vertical portion of the partition 10 between the compartments 2 and 3. The inlet 8 as shown is formed in a downwardly inclined portion 10' of the partition 10 which connects the main upper portion of the latter to a lower vertical partition portion 10'' offset to the rear of said main upper portion. The outlet 7 of the compartment 2 opens through the floor of the latter adjacent said partition portion 10''. Advantageously and as shown, suitable grilles are placed in the outlet 7 and inlet 8.

The air recirculated through the temperature modifying compartment 6 may be cooled within said compartment by its passage over a cooling device 11 which forms the expansion coil or heat absorbing device of a mechanical refrigeration system. As shown, the device 11 comprises spaced apart metal plates or fins 12 providing air passages extending transversely to tube or pipe sections 13 extending through said plates or fins. A suitable volume of air flow over the pipe sections of the device 11 is insured by the operation of a circulation fan 14 which, with its driving motor 15, is located in the compartment 6.

In an automobile intended for use where climatic conditions may make it desirable to artificially heat the compartment 2, a heating device 16 may advantageously be located in compartment 6 alongside the device 11, and so that the air moved by the fan 14 will traverse pipe sections 17 of the device 16 through which a suitable heating fluid is then caused to flow. The devices 11 and 16 may be substantially identical in construction, and may be mechanically separate or, as shown, they may have their respective pipe sections 13 and 17 traversing a common set of spaced apart fin plates 12.

Fresh air should be added to the compartment 2 in a more or less continuous manner, and with the arrangement shown in Fig. 1, the air so added may be supplied by either or both of two supply conduits 18 and 24. The conduit 18 is immediately below the floor of the car and has a rear portion which communicates with and in effect forms a bottom extension of the compartment 6, the outlet port 8 opening from the compartment 2 directly downward into the rear portion of the extension of the compartment 6 formed by the rear end of the conduit 18. The forward end of the conduit 18 of Fig. 1 is bifurcated and of the form shown in Figs. 3 and 4. One bifurcation 18a of the conduit 18 leads to one side of the automobile and communicates with the external atmosphere through an opening in the corresponding riser 19 extending vertically between the car body and the corresponding running board 20. The other bifurcation 18b leads to the other side of the automobile and communicates with the external atmosphere through an opening in the corresponding riser 19, all as is clearly shown in the drawings. Preferably means are associated with the conduit 18 for cleaning and purifying the air passing through the latter prior to the delivery of the air to the compartment 6. The means for the purpose shown comprise filters 21, one associated with each of the bifurcations 18a and 18b. Preferably each filter 21 is located as shown at the inlet end of the corresponding bifurcation to facilitate the removal and return or replacement of the filter when necessary for cleaning or repair purposes, and particularly for the renewal or regeneration of the adsorptive material such as silica-gel or activated carbon, advantageously incorporated in the filters 21 to adsorb noxious gases or fumes from the air passing into the compartment 2 through the conduit 18. Preferably each filter 21 comprises separate sections 21a and 21b, as illustrated in Figs. 7 and 8, which may or may not be assembled in a single mechanical filter unit, but which serve different purposes. The filter section 21a serves as an ordinary dust arresting filter and is interposed between the air inlet and the filter section 21b which includes the adsorptive material for adsorbing noxious gases. This disposition of the filter sections prevents the clogging or fouling of the filter section 21b by the dust arrested by the filter section 21a. A damper 22 in the main or undivided portion of the conduit 18, is provided for throttling or closing communication though the conduit between the external atmosphere and the compartment 6. As shown, the damper 22 is provided with adjusting means including a manually operable part 23 suitably located in the driver's compartment 3 of the automobile.

In lieu of or in addition to a fresh air supply conduit like the conduit 18 extending beneath the car body, in many cases I may advantageously employ a fresh air supply conduit carried by the roof portion of the body, preferably arranged with its inlet at or adjacent the front end of the roof portion, and having an outlet opening into the passenger space at the top of the latter. When such a conduit is added to an old or previously constructed automobile, the body of the conduit may be mounted on top of the roof, but in other cases the body of the conduit may well be built into the roof structure as is the conduit 24 shown in Fig. 1. The conduit 24 is shown in Fig. 1 as having its inlet end in communication with the external atmosphere in front of the windshield of the automobile, and with its rear discharge end opening downward into the compartment 2 through a grilled port 25 in the roof of the compartment located slightly to the rear of the partition 10. A damper 26, having an operating member 27, is shown for regulating the inflow of air into the compartment 2 through the conduit 24. At its front or inlet end, the conduit 24 is provided with a filter 28 which may be similar in purpose and character to the previously described filters 21.

As those skilled in the art will readily understand, the form and disposition of the fresh air supply conduits 18 and 24 permit each of those conduits to have a cross-section ample to insure a suitable volume of air flow therethrough with a relatively low linear flow velocity. Furthermore, the grilled outlet from the conduit 24 into the compartment 2 is so located and may be of such extent as to avoid any objectionable draft effect on the occupants of the compartment. It will be apparent also that the outlet 7 and the inlet 8 of the compartment 2 may be of such ample extent that with their illustrated locations, the flow therethrough will produce no objectionable draft condition in the compartment 2, even when the fan 14 is operated to create the maximum air flow required.

While both of the fresh air supply conduits 18 and 24 illustrated in Fig. 1 may be advantageously employed in combination in certain cases, either conduit may be used alone in other cases. Each conduit arrangement has certain specific advantages over the other. For example, the conduit 24, with its location in the roof of the automobile body, occupies what is otherwise waste space, and because of the relatively high level of its inlet end, supplies air which in its raw state may sometimes be considerably cleaner and purer than the air at the level of the bottom of the car body. On the other hand, the air supplied by the conduit 18 reaches the compartment 2 only after being subjected to the temperature modifying effect of the apparatus within the compartment 6 which is of some advantage, particularly when the external temperature is especially low. Moreover the suction of the fan 14 is directly effective to induce air flow through the filters 21, which is advantageous when the latter are clogged or obstructed by a considerable dust accumulation therein.

The mechanical refrigerating system shown in Figs. 1 and 2 comprises, in addition to the expansion coil or heat absorbing device 11, a compressor 29 driven by a motor 30 and drawing the refrigerant fluid from the device 11 through a conduit 31 and delivering it, after a suitable pressure increase, through the conduit 32 to a condenser 33. The refrigerant fluid which is cooled in the condenser 33 passes from the latter back to the inlet of the device 11, through a conduit 34, a receiver 35 and a conduit 36, leading from the receiver outlet to the inlet of the device 11 and including an expansion valve 37. The latter may be of any usual or suitable type, and in particular, may or may not be subject to automatic adjustment by thermostatic control means. The condenser 33, which may be of any usual or suitable type, preferably comprises spaced apart fin plates traversed by pipe sections, as do the previously described heat absorbing and heating devices 11 and 16 respectively, whereby the bulk and weight of each such device per unit of operating capacity, are kept desirably small. As shown, the condenser 33 is air cooled, and a fan 38, driven by a motor 39, is provided for moving cooling air through the condenser 33.

In the arrangement conventionally and diagrammatically illustrated in Fig. 1, the receiver 35, compressor 29, motor 30, condenser 33, and fan 38 with its motor 39, are located beneath the floor of the automobile body, and are supported from the latter through a suitable framework including suspension brackets 40. Advantageously the refrigeration elements located below the floor of the automobile body are freely exposed to contact with the external atmosphere which facilitates the dissipation of heat therefrom, particularly when the automobile is traveling rapidly. In general, however, I consider it desirable to employ a condenser cooling fan no matter how freely the condenser may be exposed to contact with the external atmosphere, and the saving in power theoretically possible as a result of the direct cooling action of the external atmosphere is of comparatively small importance since the total power consumption of the refrigerating apparatus is comparatively small. For example, in the case of a seven passenger automobile of the type illustrated in Fig. 1 for ordinary use with temperature conditions prevailing in localities where such automobiles are mainly used, efficient air conditioning with the apparatus illustrated in Figs. 1 and 2 should be obtainable with a compressor motor 30 of not more than ½ H. P., and with air moving motors 15 and 39, each of which may be of less than $\frac{1}{14}$ H. P.

In the arrangement illustrated in Figs. 1 and 2, the various motors 15, 30 and 39 are electric motors energized by current supplied by an electric generator 41, which is driven by the engine 5, through gearing shown as comprising a sprocket chain 42 connecting sprocket wheels 42a and 42b carried by the main shaft 5' of the engine 5 and the armature shaft of the generator 41, respectively. In order that it may supply current to the various motors at a suitable voltage, notwithstanding wide variations in the speed of the engine 5, the generator 41 may be provided with a suitable voltage regulator. As diagrammatically shown in Figs. 1 and 2, the voltage regulator comprises a rheostat 44 which is automatically adjusted by a device 45 responsive to the speed of the generator. The device 45, as shown, is of the centrifugal speed governor type and comprises a collar 46, secured to the shaft 42, a collar 47 slidingly mounted on the shaft 42, and centrifugal weights 48 pivotally connected to the collars 46 and 47 in the usual manner, so that as the speed of the shaft 42 increases, the centrifugal force action on the weights 48 will move the collar 47 toward the collar 46 against the yielding resistance to such movement of the usual loading spring 49, the latter moving the collar 47 away from the collar 46 as the speed of the shaft 42 diminishes. The longitudinal movement of the collar 47 on the shaft 42 is transmitted to the operating arm 50 of the rheostat 44 by a lever 51 and link 52 so that the arm 50 is turned in the clockwise or counter-clockwise direction accordingly as the speed of the shaft 42 diminishes or increases.

As the generator speed increases and decreases, the corresponding pivotal movement of the arm 50 prevents corresponding changes in the generator voltage by respectively increasing or decreasing the amount of the rheostat resistance 53 in the field circuit of the generator 41 which is self-exciting and has an exciting circuit terminal connected by a conductor 54 to the arm 50, the left-hand end of the resistance 53, as seen in Fig. 2, being connected to the conductor 55 leading away from one of the main terminals of the generator. The conductor 55 and the conductor 56 connected to the second main terminal of the generator form the current supply conductors for energizing the motors 15, 30 and 39 through suitable branch conductors connected to the terminals of those motors.

Advantageously, means are provided for the operation of the motors 15, 30 and 39 from an ordinary lighting or power circuit such as that ordinarily available in a garage in which the automobile may be stored at times when the automobile is not in use, and without requiring the operation of the automobile engine at an idling speed. This permits the cooling and ventilation of the automobile body preparatory to its use after a period of non-use in which the automobile body has become heated up or filled with foul air. To permit such operation of the motors, there may be associated with the conductors 55 and 56 included in the arrangement shown in Fig. 2, a switch 57 which may be adjusted from the position shown in full lines in which the terminals of the motors are connected to the generator 41, into the position shown in the dotted lines in which the terminals of the motors are connected through branch conductors 55' and 56' to the terminals of a socket 57' mounted on the automobile body and adapted to removably receive a plug or connector 58. The latter when in place in the socket 57 connects the branch conductors 55' and 56' to garage or other supply conductors 59 and 60, respectively. Each of the various motors may well be provided with individual controlling means including a cut-out switch 43, though ordinarily the use of the refrigerating apparatus requires the operation of all the motors with constant relative speeds. However, with the refrigerating apparatus out, and the heating means in service, the operation of the motor 14 may be desirable though the other motors are not then in use.

In the arrangement shown in Figs. 1 and 2, the heating fluid passing to the heating device 16 when the compartment 2 is to be heated, is cooling fluid used in the cooling system for the engine 5. To this end the inlet of the heater 16 is shown as connected by a pipe 60' to the upper portion of the water jacket space of the engine 5, and the outlet from the heating device 16 is connected by pipe 61 to the water space at the lower end of the radiator 62 of the engine cooling system. The pipes 60' and 61 and the pipe sections 17 of the device 16, which are connected between the pipes 60' and 61, form a bypass about the radiator for the flow of more or less of the engine cooling liquid. The flow through this bypass may be regulated by a throttle valve 63 located in the pipe 60' and adjusted manually or automatically as conditions make desirable. As shown, the valve 63 is subject to manual adjustment by a valve operating rod 64 extending through the instrument board 65 in the body compartment 3.

Liquid of condensation depositing on the fin plates 12 and pipe sections 13 of the cooling device 11 from the air moving through the latter, may be collected and disposed of in any suitable manner. As shown, the portion of the top wall of the conduit 18 beneath the cooling device 11 and subjacent heating device 16 is shaped to form a trough or collector 66, receiving water condensed out of the air moving over the cooling device. A valve or water sealed outlet, which need not be illustrated or described, may be provided for the intermittent or continuous discharge of water collecting in the receptacle 66.

The general operation of the air conditioning means illustrated in Figs. 1 and 2 will be apparent without further description. With it, the main operative results of adequate ventilation of the compartment 2 with clean air free from noxious gases or fumes and at a desirable temperature, and with such dehumidification of the air as results from the cooling action of the device 11, are obtained with apparatus which is simple, durable and effective, and which is divided into units which may be made suitably light in weight and small in bulk to facilitate their proper mounting in the limited space available. With the compartment 6 located as shown partly beneath the front seat or seats, that compartment in an automobile of the type shown in Fig. 1, may be made of suitable size for the purposes served by it with little or no sacrifice of space required for other purposes.

With the particular form of construction illustrated in Fig. 1, when the partition 10 closes communication between the compartments 2 and 3, only the air in the compartment 2 is conditioned, but it is to be noted that in such an automobile, the compartment 2 is the one in which proper air conditioning is of special importance. In such an automobile the usual ventilation provisions heretofore employed, including the damper device 67 for passing regulated amounts of fresh air into the compartment 3 through the space within the hood 4, may well be adequate for the comfort and health of the occupants of the compartment 3. Moreover, by lowering the usual glass partition member 10a forming the top of the partition 10, the compartments 2 and 3 may be placed in free communication, and in such case, with the compartment 3 fully enclosed, the same atmospheric conditions may be maintained therein as in the compartment 2. As is readily apparent, the air conditioning means shown in Figs. 1 and 2 may be used to regulate atmospheric conditions in the occupant space of an automobile of the closed body type in which said space consists at all times of but a single compartment.

While the particular form of the embodiment of the invention illustrated in Figs. 1 and 2 is regarded as specially desirable for use in most cases, with an automobile of the type therein illustrated, it will be apparent that many changes in form of the apparatus shown in Figs. 1 and 2 may be made in the use of the invention under varying conditions, and particularly in connection with automobiles having bodies and power plants of different types. For example, as illustrated in Fig. 3, the motors of the air conditioning apparatus may receive current from a storage battery 70 charged by a generator 41a driven from the main engine shaft of the automobile in any suitable way. The storage battery 70 may be individual to the air conditioning apparatus or may be the storage battery used as a source of current for car lighting and starting purposes. In the latter case, the generator 41a may be driven by the main automobile engine and have its voltage output regulated in any of the ways in which the generators of automobile lighting and starting systems are customarily driven and regulated.

In the arrangement shown in Fig. 3 the compressor 29 and motor 30 may be exactly like the corresponding parts shown in Figs. 1 and 2, except that in all cases the electric motor used must be adapted to the character of energizing current which may well have a voltage of 6 volts or so with the arrangement of Fig. 3, whereas the voltage of the generator 41 shown in Figs. 1 and 2 may well be substantially greater, for example, 110 volts or 220 volts. With the arrangement of Fig. 3 the current supplied by the storage battery is necessarily direct current, but with the arrangement of Figs. 1 and 2, the generator 41, if provided with a suitable exciting means, may supply either direct or alternating current.

The cooling and condensing units 11 and 33 of Fig. 3 may be identical with the corresponding elements of Figs. 1 and 2, but in Fig. 3 the corresponding fans 14 and 18 are carried by the opposite ends of the armature shaft of a common operating motor 15a for the two fans, said shaft extending, as shown, through the cooling unit 11. As is diagrammatically indicated in Fig. 3, the generator 41a is located in position for driving from the main engine at a point between the engine and the usual variable speed transmission 73.

Advantageously and as indicated in Fig. 3, with the arrangement there shown, the portions of the refrigerating system below the floor of the automobile body are advantageously located mainly at one side of the longitudinal center line of the automobile, one branch 18a of the bifurcated duct 18 being correspondingly shorter than the other branch 18b. The disposition of the parts just referred to may be employed with the arrangement of Figs. 1 and 2, and the latter may also include adjustable doors or dampers 74, at the inlet ends of the conduit branches 18a and 18b as shown in Fig. 3, to variably throttle the inlets to those branches and also to deflect air into those inlets when the automobile is in motion.

The arrangement shown in Fig. 4 includes a supply generator 41b similar to the generator 41 and driven from a sprocket wheel on the main engine shaft 5', as in the arrangement of Figs. 1 and 2. When an alternating current generator is employed to energize the air conditioning motors, an automatic regulator 44a may conveniently be interposed between the generator terminals and the motor terminals, as indicated in Fig. 4, to impress a suitably constant voltage on the terminals of the motors 15 and 15a, notwithstanding wide fluctuations in speed, and consequently of the voltage, of the generator 41b.

Fig. 5 illustrates an arrangement in which a refrigerating system of the particular form shown in Fig. 3 is associated with an automobile body 1 generally like that shown in Fig. 1 except for the omission of the compartment 6, and conduit 24, though the latter may be used as well with the arrangement of Fig. 5 as with that of Fig. 1. In Fig. 5, all portions of the refrigerating apparatus are located below the floor of the compartment 2 and the inlet 8' to the compartment 2 from the conduit 18 is in the floor of the compartment 2 at the rear of the outlet 7', and directly above the cooling device 11.

In the modification illustrated in Fig. 6 the compressor 29 is not driven by a separate motor, but is driven from the engine shaft 5' through a variable speed transmission automatically actuated to maintain an approximately constant compressor speed notwithstanding variations in the speed of the engine shaft 5'. This transmission in the form shown in Fig. 6 comprises a shaft 75 transverse and connected by bevel gears to the shaft 5' and rotating a friction disc 76.

A friction wheel 77 engages the face of and is driven by the disc 76 at a speed relative to the speed of the latter which depends upon the adjustment of the wheel 77 radially of the disc 76 along the shaft 78 of the compressor 29. The wheel 77, which rotates with the shaft 78, is adjusted longitudinally of the latter as required to maintain the rotative speed of the shaft 78 approximately constant, notwithstanding variations in the speed of the shaft 5' by means of a centrifugal speed governor device. The latter, as shown, comprises collars 79 and 80, centrifugal weights 81, and a loading spring 82 corresponding to the parts 46, 47, 48 and 49, respectively, of the regulator of Figs. 1 and 2. The wheel 77 is secured to one end of the collar 79. With the compressor drive illustrated in Fig. 6, the fans (not shown) used in connection with the cooling and condensing elements of the refrigerating system, may well be driven from the storage battery of the engine lighting and starting system, or in some other suitable manner.

Figs. 7 and 8 illustrate a disposition of cooling system parts differing from that shown in Fig. 1 primarily in that compressor 29 and its driving motor 30 are located above the floor of the automobile body in one portion of the compartment 6 at one end of the superposed cooling and heating devices 11 and 16 respectively.

In Figs. 7 and 8 the cooling and heating devices 11 and 16 are provided with individual motor driven fans 83 and 84 respectively. Each of these two fans may obviously be smaller than the single fan 14 of Figs. 1 and 2, which is advantageous particularly when the fans are low voltage fans adapted for energization by low voltage storage batteries. Furthermore, only the fan 83 needs be operated when the cooling element 11 is in service and the heating element 16 is out of service, and conversely, when the element 16 is in and the element 11 is out of service, only the fan 84 need be in service.

The arrangement shown in Figs. 9 and 10 differs from that shown in Figs. 1 and 2 primarily in that the compressor 29 and condenser fan 38 have their axes transverse to the length of the automobile, and in that the condenser fan motor 39 drives the compressor through a belt 85. In the arrangement shown in Figs. 9 and 10 the two motor driven fans 83 and 84 located in the compartment 6 are each used in moving air past the cooling device 11, the heating device 16 being omitted in the arrangement shown in Figs. 9 and 10, as it is in the arrangements shown in Figs. 3, 4 and 5.

In Fig. 9 the conduit 18c, replacing, and having its rear portion like that of the conduit 18 of Figs. 1 and 2, does not communicate at its forward end with the external atmosphere through openings below the floor of the car body but is extended into the space beneath the hood 4 so that it may take air from above the hood through the opening controlled by the damper or door 67. With this arrangement the filters 21 may be located with advantage below the floor of the automobile body as shown, so that they extend transversely to the length of the automobile and may be longitudinally removable through openings formed for the purpose in the risers 19.

While in accordance with the provisions of the statutes, I have illustrated and described the best forms of embodiment of my invention now known to me, it will be readily apparent to those skilled in the art that changes in form and arrangement, in addition to those illustrated, may be made without departing from the spirit of the invention as set forth in the appended claims, and that certain features of the invention may sometimes be used with advantage without a corresponding use of other features.

Having now described my invention, what I claim as new and desire to secure by Letters Patent, is:

1. In a passenger automobile having a body including an enclosed passenger space, means for supplying purified air to said space comprising conduit means having an air inlet at each side of said body and below the floor of the latter and an outlet opening to said space through the floor of said body, and air filter means associated with each inlet.

2. In a passenger automobile having a body including an enclosed passenger space, of means for supplying purified air to said space comprising conduit means having an air inlet at each side of said body and below the floor of the latter and an outlet opening to said space through the floor of said body and air filter means associated with each inlet and comprising adsorbent means for absorbing noxious gases from the air passing from said inlets to said outlet.

JOHN ALLSTON SARGENT.